(12) United States Patent
Flynn (10) Patent No.: US 9,325,589 B1
(45) Date of Patent: Apr. 26, 2016

(54) AUDIBLE NETWORK TRAFFIC NOTIFICATION SYSTEM

(71) Applicant: Jeff Flynn, Irvine, CA (US)

(72) Inventor: Jeff Flynn, Irvine, CA (US)

( * ) Notice: Subject to any disclaimer, the term of this patent is extended or adjusted under 35 U.S.C. 154(b) by 84 days.

(21) Appl. No.: 14/061,754

(22) Filed: Oct. 23, 2013

Related U.S. Application Data (60) Provisional application No. 61/717,577, filed on Oct. 23, 2012.

(51) Int. Cl.
    *H04L 12/26* (2006.01)
(52) U.S. Cl.
    CPC .................. *H04L 43/062* (2013.01)
(58) Field of Classification Search
    None
    See application file for complete search history.

(56) References Cited

U.S. PATENT DOCUMENTS

| | | | |
|---|---|---|---|
| 7,849,502 B1* | 12/2010 | Bloch et al. ...................... 726/11 |
| 2003/0123448 A1* | 7/2003 | Chang .......................... 370/395.1 |
| 2004/0044912 A1* | 3/2004 | Connary et al. .............. 713/201 |
| 2008/0089238 A1* | 4/2008 | Fahmy .......................... 370/252 |
| 2009/0051507 A1* | 2/2009 | Outlaw et al. .............. 340/384.1 |
| 2013/0036469 A1* | 2/2013 | Worth .............................. 726/23 |

\* cited by examiner

*Primary Examiner* — Derrick Ferris
*Assistant Examiner* — Jay Vogel
(74) *Attorney, Agent, or Firm* — Kafantaris Law Offices; Theo Kanfantaris (57) ABSTRACT

A network traffic notification system is disclosed that monitors network traffic and provides sound alerts for varying degrees of threatening/non-threatening network traffic. Furthermore, the network traffic notification system will prioritize and analyze data, associating the network activity to various sounds which may correspond to different levels of suspicious or non-suspicious activity. Sounds for threatening activity will be very distinct in order to notify the user of possible security risks.

12 Claims, 5 Drawing Sheets

AUDIBLE NETWORK TRAFFIC NOTIFICATION SYSTEM

CROSS-REFERENCE TO RELATED APPLICATIONS

This application claims the benefit of U.S. Provisional Patent Application No. 61/717,577, filed on Oct. 23, 2012, and incorporated herein by reference.

STATEMENT REGARDING FEDERALLY SPONSORED RESEARCH AND DEVELOPMENT

Not Applicable.

FIELD OF THE INVENTION

This invention relates generally to a network traffic notification system, and more particularly, to a system for alerting and notifying a user of network traffic through the use of audible alerts.

DISCUSSION OF RELATED ART

Many businesses, offices, and facilities which utilize multiple computers and computer users implement the use of a network system to efficiently manage and monitor these computers. Networked systems are sometimes referred to as a LAN or Local Area Network. Typically, a network system consists of a collection of computers and hardware devices interconnected with one another allowing for sharing of data, resources and information. A large part of network management relates to maintaining and ensuring security, which can be aided through a network monitoring device called a network traffic analyzer.

A network tap, or simply, 'tap,' can generally be described as a hardware device that allows access to data flowing between two points in a network. Typically, a tap has at least 3 physical ports: an A port, a B port, and a monitor port. The monitor port is used to monitor, or 'listen,' to data flow between points A and B without impeding normal network traffic flow between points A and B.

Taps are frequently used in conjunction with a network or packet sniffer, more commonly called a 'sniffer.' Generally, a sniffer is a software application that communicates with the tap to intercept traffic passing over a network via a utility that can capture, view, log, and analyze network data. Network users are then able to observe live communication, data packet information, and IP packet information.

The protocol analyzer, or packet analyzer, is a device that functions by receiving the captured data packets from the sniffer, which are then decoded into a human-readable form. This allows network users to detect errors, review exchanged information, and reconstruct various types of data streams. In addition, the analyzer provides extremely useful security and notification information by allowing a network administrator to classify traffic, view unauthorized users on a given network, and identify open ports and foreign IP addresses.

While several network notification systems exist, there is no current system that provides the enhanced security of live sound alerts to network administrators providing notification of dangerous or suspicious protocols and network behavior, even when they may not be actively monitoring all systems within the network. Therefore, a need exists for a sound-based network notification system that audibly alerts network administrators of a security breach or suspicious activity. The present invention satisfies these needs.

SUMMARY OF THE INVENTION

The present invention will provide a network traffic notification system that monitors network traffic and provides sound alerts for varying degrees of threatening/non-threatening network traffic. Furthermore, the network traffic notification system will prioritize and analyze data, associating the network activity to various sounds which may correspond to different levels of suspicious or non-suspicious activity.

The present invention implements four modules to perform the above tasks: a network monitoring module, a network logging module, a network analyzing module, and a sound generation module with an audio speaker. The network monitoring module allows access to a physical network. The network logging module allows users to view live communication without a network tap. The network analyzing module will analyze, decode and prioritize network traffic, assign specific sounds by traffic type, and notify the user of all network traffic. The sound generation module will generate the associated specific sounds which map to characteristics of the traffic. These sounds are represented as data that is converted to an output analog voltage and sent to the audio speaker.

The present invention will produce generally pleasant (or tranquil) sounds for common traffic, and alerting (or disturbing) sounds for threatening traffic. The sound generation module will play the appropriate sounds. As such, the user will quickly and easily distinguish normal traffic and malicious traffic in the context of his current activities on the monitored network. For example, FTP traffic is often considered to be an unsafe protocol because it allows passwords to be transmitted unencrypted over a network. Still, FTP traffic can be a useful tool for a system administrator. The present invention will produce a disturbing sound for FTP communications. The user will notice this disturbing sound when using ftp. Eventually, he will recognize this whenever he uses this protocol.

Likewise, when the user is using a safer protocol, such as https, he will learn to expect a different and more tranquil sound. Eventually, if the user hears either sound at a time when he has not issued commands which would normally result in these sounds, he will recognize that something unusual is happening. This unusual happening may or may not be malicious. Malicious network activity, however, would frequently generate these sorts of unusual happenings and would thus be more easily detected and more frequently subjected to analysis.

These and other objectives of the present invention will become obvious to those of ordinary skill in the art after reading the following detailed description of the preferred embodiments. It is to be understood that the foregoing general description and the following detailed description are exemplary, and are intended to provide further explanation of the invention as claimed.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Figure 1:
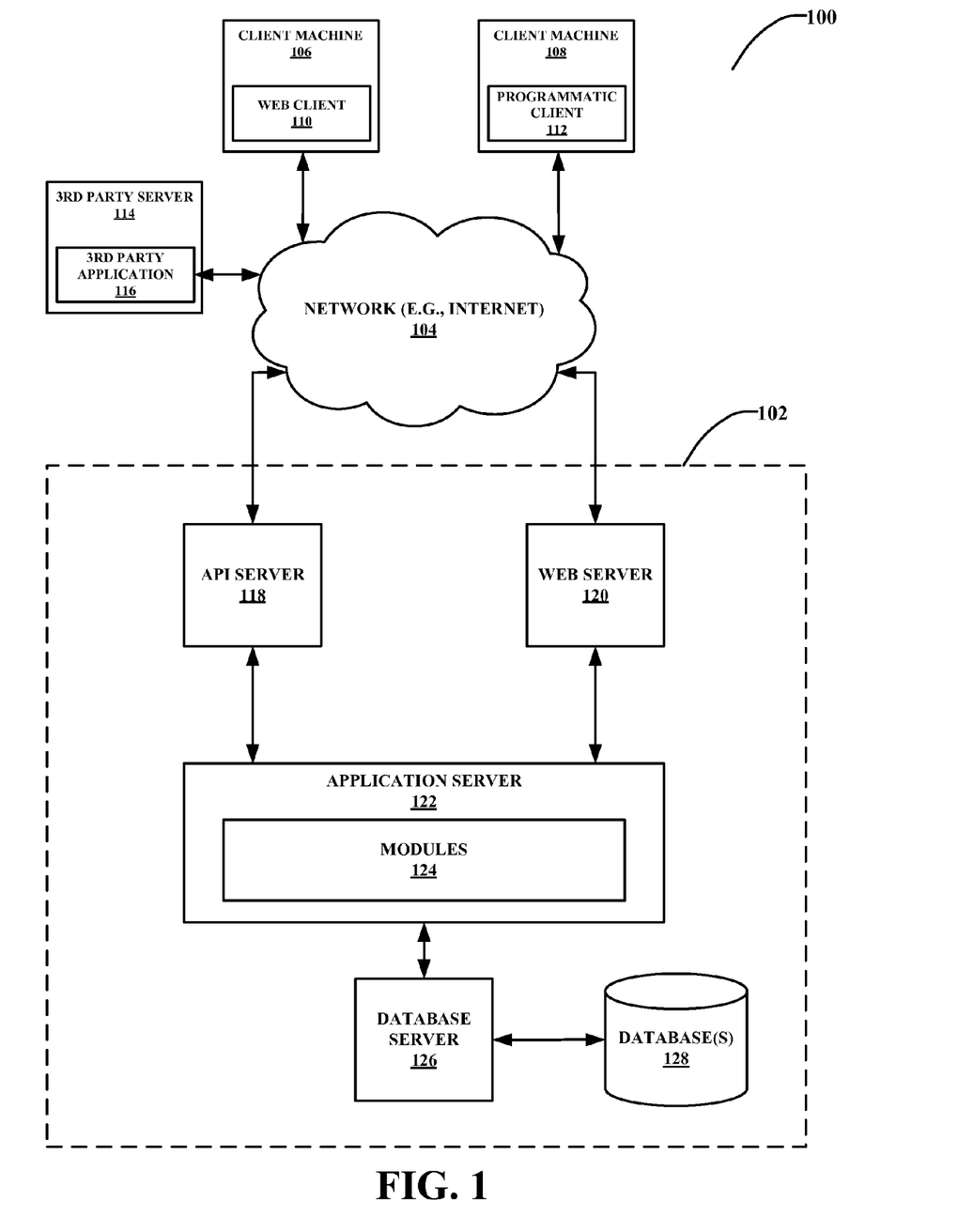
FIG. 1 is a diagram schematically illustrating a network wherein the server and client machines are connected.

FIG. 1 depicts a block diagram of a computer system 100 suitable for implementing aspects of the present invention. As shown in FIG. 1, computer system 100 includes the present invention 102, which interconnects major subsystems such as an API server 118, web server 120, application server 122, and database server 126 having a storage means 522. The application server 122 consists of several modules 124, and a database 128 exists on the database server 126. The present invention 102 connects to client machines 106 and 108, as well as 3rd party servers 114, through a network 104. Web clients 110 and programmatic clients 112 exist on the client machines 106 and 108, respectively, and 3rd party applications 116 that exist on the third party server 114.

Figure 2:
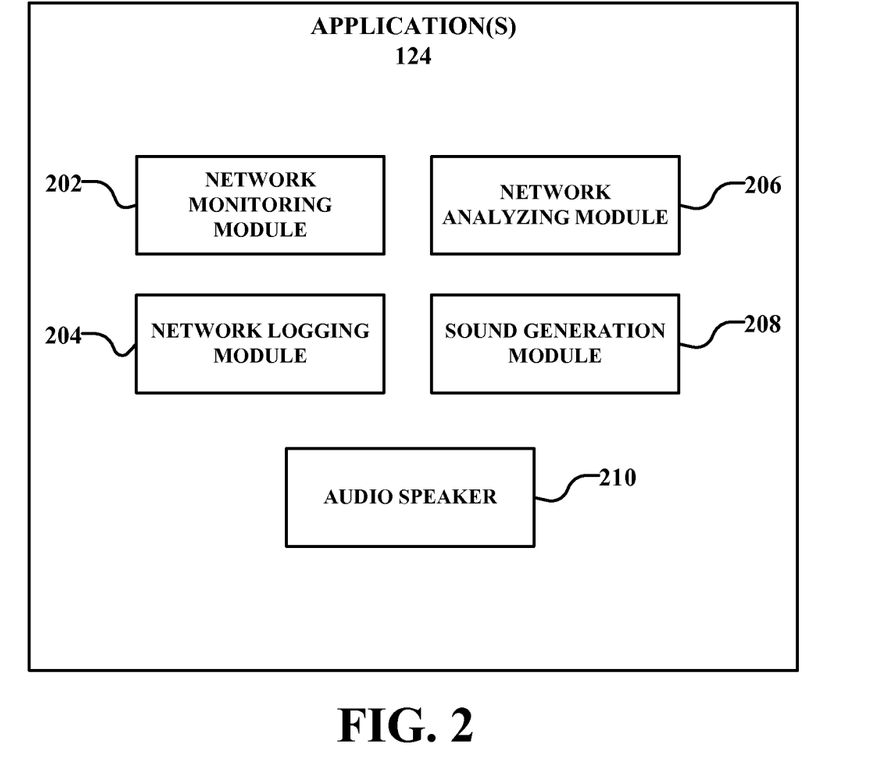
FIG. 2 is a diagram schematically illustrating the modules of the present invention.
Figure 3:
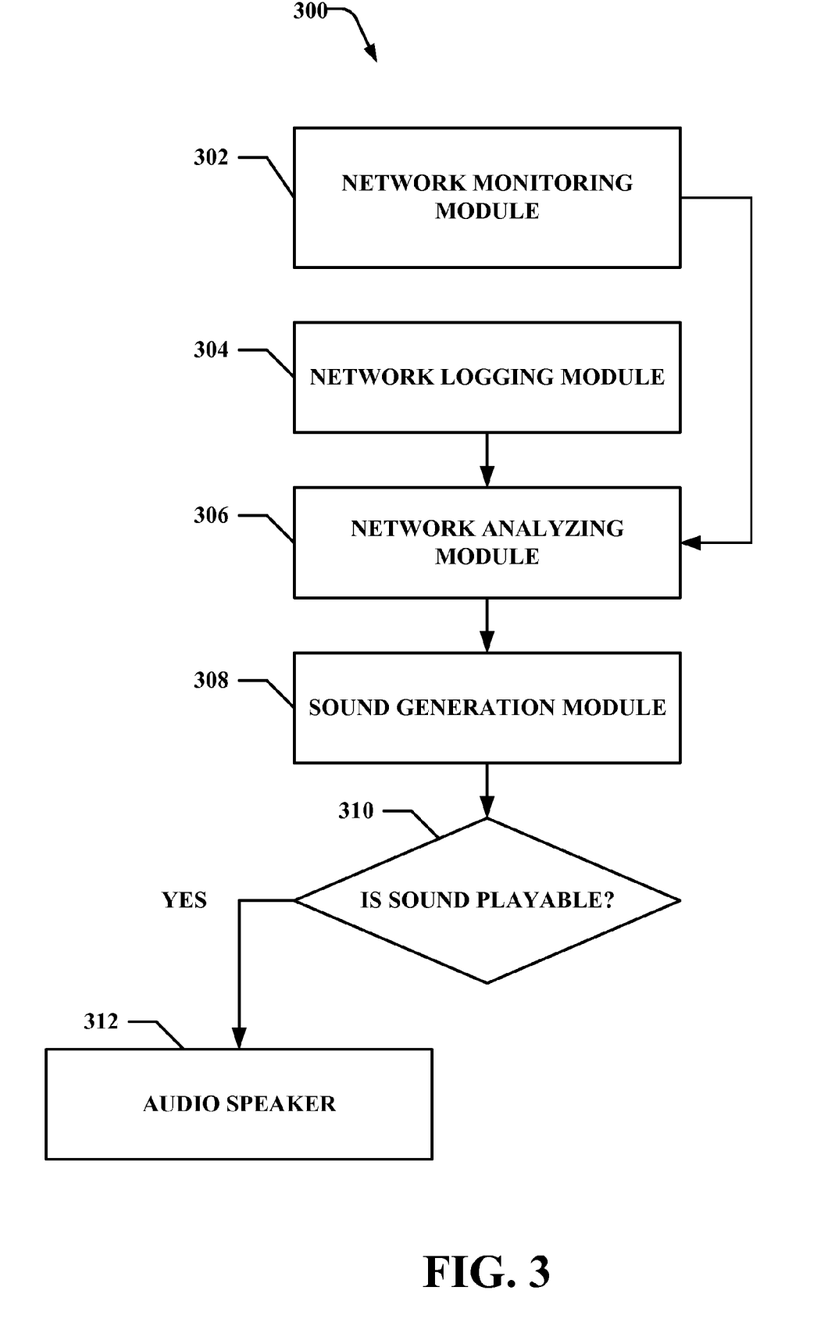
FIG. 3 is a diagram schematically illustrating the interaction between the modules of the present invention.
Figure 4:
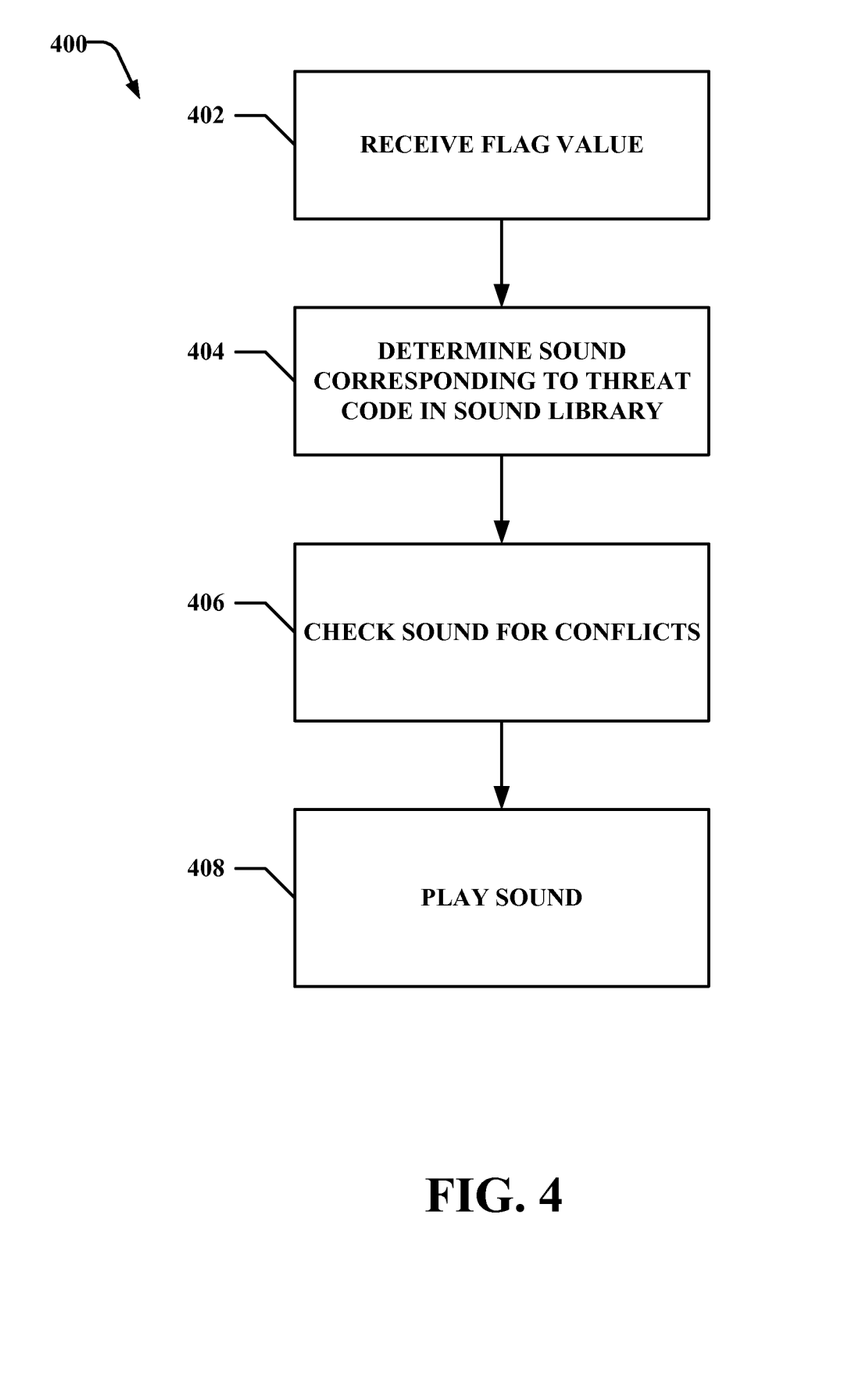
FIG. 4 is a diagram schematically illustrating the steps of the present invention.
Figure 5:
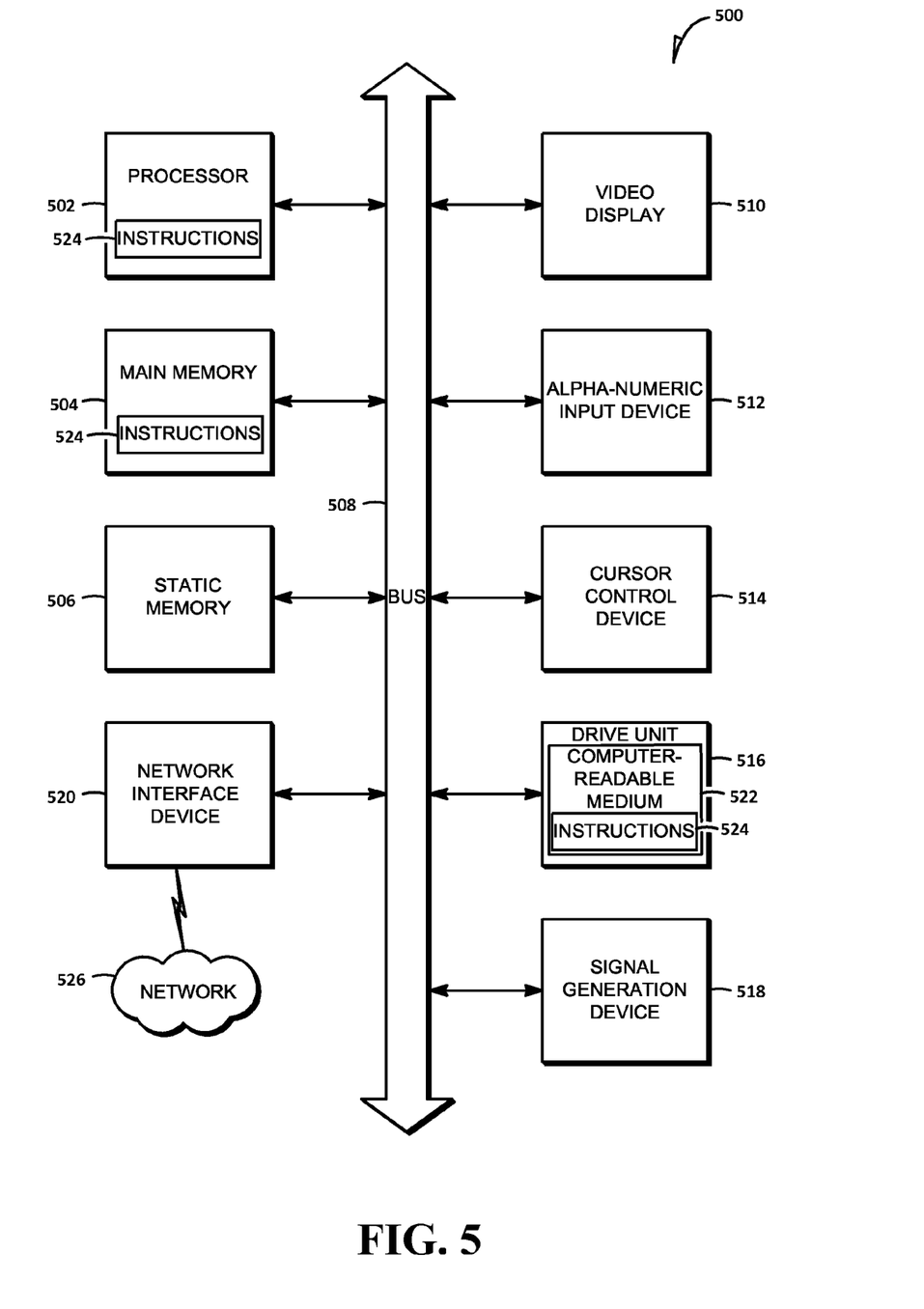
FIG. 5 is a flowchart illustrating a system where the present invention can be exercised.

The present invention comprises a network monitoring module 202, a network logging module 204, a network analyzing module 206, and a sound generation module 208 with an audio speaker 210. These components are contained in an enclosure having an input, such as a touch screen display, and various other controls, along with a method of connecting a secondary storage device for accessing saved packets. The modules are adapted to reading, analyzing, and prioritizing detected network traffic events and notifying the user of normal and abnormal network traffic events through sound. The user will learn to associate the normal sounds generated by the device with the activities he is commanding his computer to perform. Normal sounds may include sounds meant to indicate the danger of a particular event.

For example, a packet of a particular unsafe protocol such as telnet may cause the device to generate a disturbing sound. This disturbing sound would be normal if the user had commanded his system to use this particular protocol. Similarly, abnormal sounds may include sounds that are not selected to indicate danger. For example, a relatively safe protocol like HTTPS might be used by malware on the user machine for communicating with a home base. If the user hears this sound when he has not commanded his system to establish an HTTPS connection, he will recognize this as an abnormal event. As such, the user learns to use the sounds he hears within the context of what he is doing to distinguish common and malicious traffic.

The network monitoring module 202 provides a means for accessing network traffic, specifically, a plurality of packets. In the preferred embodiment, the network monitoring module 202 will comprise a physical Ethernet connection to a LAN within the external enclosure encompassing the above modules. Only one port is necessary to connect to an external network tap or switch monitoring port, although additional ports may be provided for transparently monitoring the network traffic monitored by other types of monitoring devices (e.g. network intrusion detection systems) operating in parallel.

In an alternative embodiment, the network monitoring module 202 will connect directly to an external network port having access to a network and its packets. Generally, a network tap is preferred as opposed to switch monitor ports because they can hide that traffic is being monitored, as network taps do not generate traffic on their own. Switches, depending on their configuration, do generate additional traffic that may help an attacker detect network traffic monitoring (eg. LLDP packets). Switches, however, can be configured to aggregate the inbound and outbound traffic associated with one or more switch ports and send the combined traffic out the switch's monitor port.

In a further alternative embodiment, the network monitoring module 202 will be connected between the end system (e.g. PC, thin client, MAC, host) and the intermediate system (e.g. router, switch, cable modem, firewall, etc.). Traffic sent from the end system to the intermediate system will be handled separately from traffic sent from the intermediate system to the end system. In this way, it is possible to independently control the volume of sounds associated with packets heading to or from the end system. This can be useful when trying to determine whether unusual traffic is being generated by the end system. If so, it is possible that the end system has been compromised. Likewise, unusual traffic originating from systems other than the end system might be an indication of a new attack the user has not previously encountered. As such, two volume controls will be provided in this embodiment, the first controlling the volume of sounds associated with inbound traffic and the second controlling the volume of sounds associated with outbound traffic.

In yet a further alternative embodiment, the network monitoring module 202 will connect to the end system, which is connected to the intermediate system. In still yet a further alternative embodiment, the network monitoring module 202 will be software stored and executed on the end system, receiving network traffic through the operating system of the end system.

The network logging module 204 receives all network traffic from the network monitoring module. Within the network traffic we have a plurality of packets which will be captured and stored on a non-transitory storage medium 524. The packets will be parsed by the network logging module 204, which will populate a packet database with packet information. The data structure of the packet database will have various entries for packet information, comprising packet protocol, packet length, packet number, packet source address, packet destination address, packet port, packet date, packet time, packet frequency, packet body, packet error correction data, and a packet flag. In a further alternative embodiment, the network logging module 204 will include a filter responsible for filtering out certain types of network traffic to be included in the packet database; packets which are of no concern or known to be non-threatening.

The network packet analyzing module 206 will compare the packets in the packet database to a rule set and assign a flag value to each packet according to the rule set. The rule set includes a list of known packet protocols and their specifications. Each known packet is grouped hierarchically in tier groups, comprising a subset of all known packets. Each tier is assigned a flag value, and non-conforming packets also have a flag value. The network packet analyzing module 206 will then compare the packets in the packet database with all known packets and assign a flag value corresponding with the flag value for each tier group or for non-conforming packets. Furthermore, a separate flag can be assigned to incoming and outgoing traffic. For example, a TCP connection has two endpoints each consisting of an IP address and a port number. TCP packets for each connection can have a unique associated sound to distinguish when multiple TCP connections are being established.

In an alternative embodiment, specific packets (such as a SYN packet for establishing a new TCP connection, FIN packet for terminating a TCP connection, or RST packet for resetting a TCP connection) can be assigned specific sounds for additional security and notification. For example, if a computer receives significantly more FIN packets than SYN packets, it could mean that an attacker is mounting a type of port scan meant to be undetected by certain intrusion detection methods. Also, very small packet fragments are unusual and may be indicative of certain types of attacks against unsophisticated firewalls, and as such, should receive heightened scrutiny.

In a further alternative embodiment, the network analyzing module 206 will check traffic for syntax and assign the proper sound to alert the user if any packets are manipulated/non-conforming. For example, the TCP header of TCP packets can be checked for flags, including SYN, FIN, ACK, RST, PSH, URG, ECE, CWR and NS bits. Certain combinations of these flags are not legal, such as a single TCP packet having both the SYN and FIN bits set. As such, illegal combinations could have a particular annoying sound associated with them (Ex. the sound of a spring coming unsprung).

The sound generation module 208 is configured to receive the flag values and generate a distinct sound according to the flag value. In a further alternative embodiment, the sound generation module 208 plays sounds for filtered traffic only. Common traffic (e.g. HTTP requests) will have gentle, natural, pleasant sounds (raindrops, running water, water flowing, infant cooing, birds chirping, crickets, and other tranquil sounds), while harmful or potentially threatening activity will have more alarming sounds (dogs barking, crows cawing, lions roaring, thunder, explosions, alarms, sirens, alerts, buzzers, gunshots, car crashes, etc.).

Certain protocols are known to be more vulnerable than others. In particular, certain protocols make use of passwords transmitted in an unencrypted manner. These protocols include Telnet and FTP. Such protocols could have an annoying sound associated with them, reminding them that are using a dangerous protocol. Additionally, this noise might also help administrators know when company security rules are being broken. Furthermore, common traffic caused by a virus or spyware may be detected by analyzing the network traffic patterns caused by them.

Typical network traffic can be very busy. Accordingly, the sound generation module 208 will be capable of overlapping up a predefined number of sounds simultaneously. In the preferred embodiment, the predefined number is 32 sounds, although any number can be used. This principle sounds natural to a user when the played sounds are raindrops, as, in nature, when raining it is common to hear many within a short period of time. Alternatively, collective sounds played simultaneously may instead be played to comprise a chord which can be considered pleasing or annoying. For example, a C, an E, and a G note is a major chord which may be considered pleasing or tranquil, while a C and C sharp played together may be considered to be displeasing or annoying.

When traffic levels are high, it may become desirable to lower the volume or repetition rate of certain sounds. This way, it will be easier to hear other simultaneously playing sounds that might be important. As such, the volume of certain traffic can be reduced based on the repetition rate of that sound. Also, rather than always playing a sound in response to every event, certain events can be ignored based on how frequently these events occur. Once a sound has passed these checks, the sound generation module 208 will read the digital data representing the sound and convert this to an analog voltage signal. A speaker 210 will receive the specified analog voltage signal from the sound generation module 208 and physically reproduce the desired sound.

The present invention will also provide a means of updating its functionality, such as providing new sounds, providing newer virus traffic detectors, or updating general functionality. For those who wish to have a different sound set, a sound library may be downloaded and placed on removable media for upgrading. Alternatively, an additional port may be included for establishing encrypted communications to a remote server for software or sound library updates. This interface would only be used when the user requests to update his software or sound libraries, and would be automatically disabled after the update.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A network notification system that monitors network traffic, the system comprising:
   a network monitoring module configured to access network traffic, said network traffic further comprising a plurality of packets;

a network logging module configured to capture said plurality of packets, parse said plurality of packets, and populating a packet database with said parsed packets;

a network analyzing module configured to compare said packet database to a rule set and assign a flag value to each packet according to said rule set, said rule set further comprising a plurality of known packet protocols and corresponding packet specification and a plurality of hierarchical tier groups, each tier group comprising a subset of said known packet protocols, a flag value for each tier group; and a flag value for nonconforming packets, wherein said network analyzing module compares said packet database with said known packet specifications and assigns said flag value to each packet according to said rule set of said packet database according to said tier group or nonconforming packet;

a sound generation module configured to receive said flag values and generate a distinct sound for each flag value;

a display configured to display said packet database; and a non-transitory storage medium configured to store said packet database;

wherein said distinct sounds are generated dependent on said flag value, said distinct sounds adapted to alert a user of abnormal network traffic.

2. The network notification system of claim 1, wherein the data structure of said packet database further comprises:
packet protocol;
packet length;
packet number;
packet source address;
packet destination address;
packet date;
packet time;
packet frequency;
packet body;
packet error correction data; and
packet flag;
wherein said data structure is populated by individual packets from said parsed plurality of packets.

3. The network notification system of claim 2, wherein said plurality of flag values for each tier group further comprise a numerical value, wherein larger numerical values are commensurate with larger network threats.

4. The network notification system of claim 3, said sound generation module further comprising generating a distinct sound for each packet type.

5. The sound generation module of claim 3, wherein the sound generation module further comprises generating a pleasant sound for smaller numerical values and generating an unpleasant sound for larger numerical values commensurate with larger network threats.

6. The network notification system of claim 1, wherein said network monitoring module further comprises a physical Ethernet tap and said sound generation module further comprises a speaker, wherein said network monitoring module, network logging module, network analyzing module, sound generation module, display, and non-transitory storage medium are contained in a single enclosure.

7. The network notification system of claim 1, wherein said network monitoring module further comprises a physical Ethernet tap and said sound generation module further comprises a speaker, wherein said network logging module, network analyzing module, sound generation module, display, and non-transitory storage medium are contained in a single enclosure.

8. A processor-implemented method for network notification, the method comprising:

monitoring network traffic, said network traffic further comprising a plurality of packets;
capturing said plurality of packets;
parsing said plurality of packets;
populating a packet database with said parsed packets;
comparing said packet database to a rule set, said rule set further comprising a plurality of known packet protocols and corresponding packet specification and a plurality of hierarchical tier groups, each tier group comprising a subset of said known packet protocols, a flag value for each tier group; and a flag value for nonconforming packets;
assigning a flag value to each packet according to said rule set, wherein said network analyzing module compares said packet database with said known packet specifications and assigns said flag value to each packet according to said rule set of said packet database according to said tier group or nonconforming packet, wherein said plurality of flag values for each tier group further comprise a numerical value, wherein larger numerical values are commensurate with larger network threats;
generating a distinct sound for each flag value, wherein a pleasant sound is generated for smaller numerical values and an unpleasant sound is generated for larger numerical values commensurate with larger network threats;
displaying said packet database on a display; and
storing said packet database on a a-non-transitory storage medium;
wherein said distinct sounds are generated dependent on said flag value, said distinct sounds adapted to alert a user of abnormal network traffic.

9. The method of claim 8, wherein the data structure of said packet database further comprises:
packet protocol;
packet length;
packet number;
packet source address;
packet destination address;
packet date;
packet time;
packet frequency;
packet body;
packet error correction data; and
packet flag;
wherein said data structure is populated by individual packets from said parsed plurality of packets.

10. A non-transitory computer-readable storage medium storing a set of instructions that, when executed by a processor, cause the processor to perform operations, comprising:
monitoring network traffic, said network traffic further comprising a plurality of packets;
capturing said plurality of packets;
parsing said plurality of packets;
populating a packet database with said parsed packets;
comparing said packet database to a rule set, said rule set further comprising a plurality of known packet protocols and corresponding packet specifications and a plurality of hierarchical tier groups, each tier group comprising a subset of said known packet protocols, a flag value for each tier group; and a flag value for nonconforming packets,
assigning a flap value to each packet according to said rule set, wherein said comparing comprises comparing said packet database with said known packet specifications and assigning said flag value to each packet according to said rule set of said packet database according to said tier group or nonconforming packet, wherein said plurality of flag values further comprise a numerical value, wherein larger numerical values are commensurate with larger network threats;
generating a distinct sound for each flag value;
displaying said packet database on a display;
and storing said packet database on a non-transitory storage medium; wherein said distinct sounds are generated dependent on said flag value, said distinct sounds adapted to alert a user of abnormal network traffic.

11. The non-transitory computer-readable storage medium of claim 10, wherein the data structure of said packet database further comprises:
packet protocol;
packet length;
packet number;
packet source address;
packet destination address;
packet date;
packet time;
packet frequency;
packet body;
packet error correction data; and
packet flag;
wherein said data structure is populated by individual packets from said parsed plurality of packets.

12. The non-transitory computer-readable storage medium of claim 11, further comprising generating a distinct sound for each flag value, wherein a pleasant sound is generated for smaller numerical values and an unpleasant sound is generated for larger numerical values commensurate with larger network threats.

* * * * *